US010110832B2

(12) United States Patent
An et al.

(10) Patent No.: US 10,110,832 B2
(45) Date of Patent: Oct. 23, 2018

(54) METHOD AND APPARATUS TO REDUCE DISPLAY LAG USING SCALING

(71) Applicant: Samsung Display Co., Ltd., Yongin, Gyeonggi-Do (KR)

(72) Inventors: Bo Young An, Hwaseong-si (KR); Ho Suk Maeng, Seoul (KR); Weon Jun Choe, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 124 days.

(21) Appl. No.: 14/710,196

(22) Filed: May 12, 2015

(65) Prior Publication Data

US 2016/0139778 A1    May 19, 2016

(30) Foreign Application Priority Data

Nov. 14, 2014   (KR) ........................ 10-2014-0158973

(51) Int. Cl.
```
H04N 5/262    (2006.01)
H04N 5/272    (2006.01)
G06F 3/041    (2006.01)
G06F 1/32     (2006.01)
```

(52) U.S. Cl.
CPC ......... *H04N 5/2628* (2013.01); *G06F 1/3234* (2013.01); *G06F 3/0416* (2013.01); *H04N 5/272* (2013.01)

(58) Field of Classification Search
CPC ...... G06F 3/041; G06F 3/0416; G06F 3/0485; H04N 5/272; H04N 5/2628
See application file for complete search history.

(56) References Cited

U.S. PATENT DOCUMENTS

| | | | |
|---|---|---|---|
| 2005/0175251 A1* | 8/2005 | Taketa ................. | H04N 19/647 382/248 |
| 2006/0012616 A1* | 1/2006 | Paek ........................ | G09G 3/20 345/698 |
| 2010/0277505 A1* | 11/2010 | Ludden ................. | G06F 3/0416 345/634 |
| 2014/0313144 A1 | 10/2014 | Seto et al. | |

FOREIGN PATENT DOCUMENTS

| KR | 10-2012-0049997 A | 5/2012 |
| KR | 10-2014-0027422 A | 3/2014 |
| KR | 10-2014-0126263 A | 10/2014 |

* cited by examiner

*Primary Examiner* — Michael Faragalla
*Assistant Examiner* — Chayce Bibbee
(74) *Attorney, Agent, or Firm* — Innovation Counsel LLP

(57) ABSTRACT

A system according to an exemplary embodiment includes: a first scaler configured to receive a plurality of touch events and down-scale the touch events to generate down-scaled touch events; a touch path logic unit configured to generate an output based on the down-scaled touch events; and a rendering logic unit configured to receive a video image, receive an output of the touch path logic unit, generate a display image by combining the video image with an overlay data according to the output of the touch path logic unit, and output the display image.

13 Claims, 6 Drawing Sheets

METHOD AND APPARATUS TO REDUCE DISPLAY LAG USING SCALING

CROSS-REFERENCE TO RELATED APPLICATION

This application claims priority to and the benefit of Korean Patent Application No. 10-2014-0158973 filed in the Korean Intellectual Property Office on Nov. 14, 2014, the entire contents of which are incorporated herein by reference.

BACKGROUND (a) Field

The present disclosure relates to display devices including touch input devices, and more particularly, to a method and system for reducing display lag between touch input devices and display devices as well as decreasing power consumption.

(b) Discussion of the Background

A terminal may display an image to a user using a display panel combined with a touch sensor panel and receive touches from the user. For example, the terminal may display a graphic image on the display panel, and the user may touch a screen including the touch sensor panel (e.g., using an active stylus, a passive stylus, or a part of a body such as a finger) to interact with the terminal, thereby providing an intuitive user interface.

Touch events detected by the touch sensor panel may be processed by an application software running on an application processor (hereinafter, AP) of the terminal. Due to the many processing steps between the touch sensor panel and the AP and a non-deterministic processing time incurred by the AP (e.g., delays due to other calculations performed by the AP), the user may experience a high latency in the form of decreased responsiveness of the terminal.

Most people indicate that they can sense asynchrony of even 30 milliseconds between what they touch and what they see. Thus, delays of 50 milliseconds to 200 milliseconds often result in increased user complaints.

Further, when a low resolution image is transmitted between the AP and the display panel to display the low resolution image on a high resolution display panel, power consumption similar to that of a high resolution image being transmitted is required.

Accordingly, a technology for up-scaling the low resolution image after it is transmitted between the AP and the display panel is being developed so that the low resolution image may be suitably displayed by the high resolution display panel.

The above information disclosed in this Background section is only for enhancement of understanding of the background of the present system method, and therefore, it may contain information that does not form the prior art that is already known in this country to a person of ordinary skill in the art.

SUMMARY

An objective of the present system and method is to solve the aforementioned problems and other problems. For example, the present disclosure provides a method for reducing latency between a touch event and a display response to the touch event, and a terminal using the same. The present disclosure also provides a method for reducing power consumption due to a touch event and a display response for the touch event, and a terminal using the same.

To achieve the aforementioned or other objectives, a system according to an exemplary embodiment includes: a first scaler configured to receive a plurality of touch events and down-scale the touch events; a touch path logic unit configured to generate an output based on the down-scaled touch events; and a rendering logic unit configured to receive a video image, receive an output of the touch path logic unit, generate a display image by combining the video image with overlay data according to the output of the touch path logic unit, and output the display image.

The system may further include a second scaler configured to receive the display image and up-scale the display image to generate an up-scaled display image.

The system may further include an application processor configured to generate the video image.

The application processor may be further configured to generate a signal for controlling the first and second scalers by using a comparison result of a resolution of the video image and a resolution of a display panel for displaying the up-scaled display image.

The signal for controlling the first and second scalers may include information about degrees of the down-scaling and the up-scaling.

The system may further include a touch controller configured to receive a plurality of touch signals from a touch sensor panel to generate the touch events.

The output generated by the touch path logic unit may include mask data in the form of a matrix of values that respectively identify an operation of the rendering logic unit to construct the display image, and positions of the values in the matrix may correspond to positions of pixels in the display image.

The rendering logic unit may combine the video image with the overlay data by determining whether to output the corresponding pixel of the video image or the overlay data according to the values of the corresponding positions in the mask data for the respective pixels in the display image.

The touch path logic unit may be further configured to receive parameters, calculate an estimated touch path according to the down-scaled touch events, and generate the mask data according to the estimated touch path and the parameters, and the parameters may control a position of a mask area, or a width, a style, or a shape of the estimated touch path.

A method for providing visual feedback to a touch input according to an exemplary embodiment includes: receiving a plurality of touch events; down-scaling the touch events; generating an output based on the down-scaled touch events; receiving a video image; receiving the output; combining the video image with overlay data according to the output to generate a display image; and outputting the display image.

The method may further include receiving the display image and up-scaling the display image to generate an up-scaled display image.

The method may further include displaying the up-scaled display image on a display panel.

The method may further include: comparing a resolution of the video image and a resolution of the display panel; and generating a signal for controlling first and second scalers based on a result of the comparison.

The signal for controlling the first and second scalers may include information about degrees of the down-scaling and the up-scaling.

The method may further include receiving a plurality of touch signals from a touch sensor panel and generating the touch events based on the plurality of touch signals.

Generating the output may include generating mask data according to the down-scaled touch events, the mask data may include a matrix of values that respectively identify an operation of a rendering logic unit to construct the display image, and positions of the values in the matrix may correspond to positions of pixels in the display image.

Constructing the display image may include combining the video image with the overlay data by determining whether to output the corresponding pixel of the video image or the overlay data according to the values of the corresponding positions in the mask data for the respective pixels in the display image.

The generating the output may further include: receiving parameters; calculating an estimated touch path according to the down-scaled touch events; and generating the mask data according to the estimated touch path and the parameter. The parameters may control a position of a mask area, or a width, a style, or a shape of the estimated touch path.

An accelerator according to an exemplary embodiment includes: a memory in which commands are stored; and a processor for receiving rendered video frames from an application processor according the commands, receiving a plurality of touch signals from a touch sensor panel, down-scaling the touch signals, determining a touch path based on the down-scaled touch signals, updating the rendered video frames based on the touch path and stored overlay data to generate updated video frames, and up-scaling the updated video frames to output them to the display.

A display device according to an exemplary embodiment may include: a display including a touch sensor panel; an application processor for rendering video frames; and an overlay unit for receiving the video frames from the application processor, receiving a plurality of touch signals from a touch sensor panel, down-scaling the touch signals, determining a touch path based on the down-scaled touch signals, updating the rendered video frames based on the touch path and stored overlay data to generate updated video frames, and up-scaling the updated video frames to display them on the display.

According to at least one of the exemplary embodiments disclosed herein, the latency between the touch event and the display response for the touch event can be reduced.

In addition, according to at least one of the exemplary embodiments, power consumption of the terminal can be decreased.

An additional range of applicability of the present system and method will become clear from the following detailed description.

Since various modifications and alternations within the spirit and scope of the present system and method may be clearly understood by those skilled in the art, the detailed description and specific exemplary embodiments of the present system and method are provided only as examples.

DETAILED DESCRIPTION OF THE EMBODIMENTS

Figure 1:
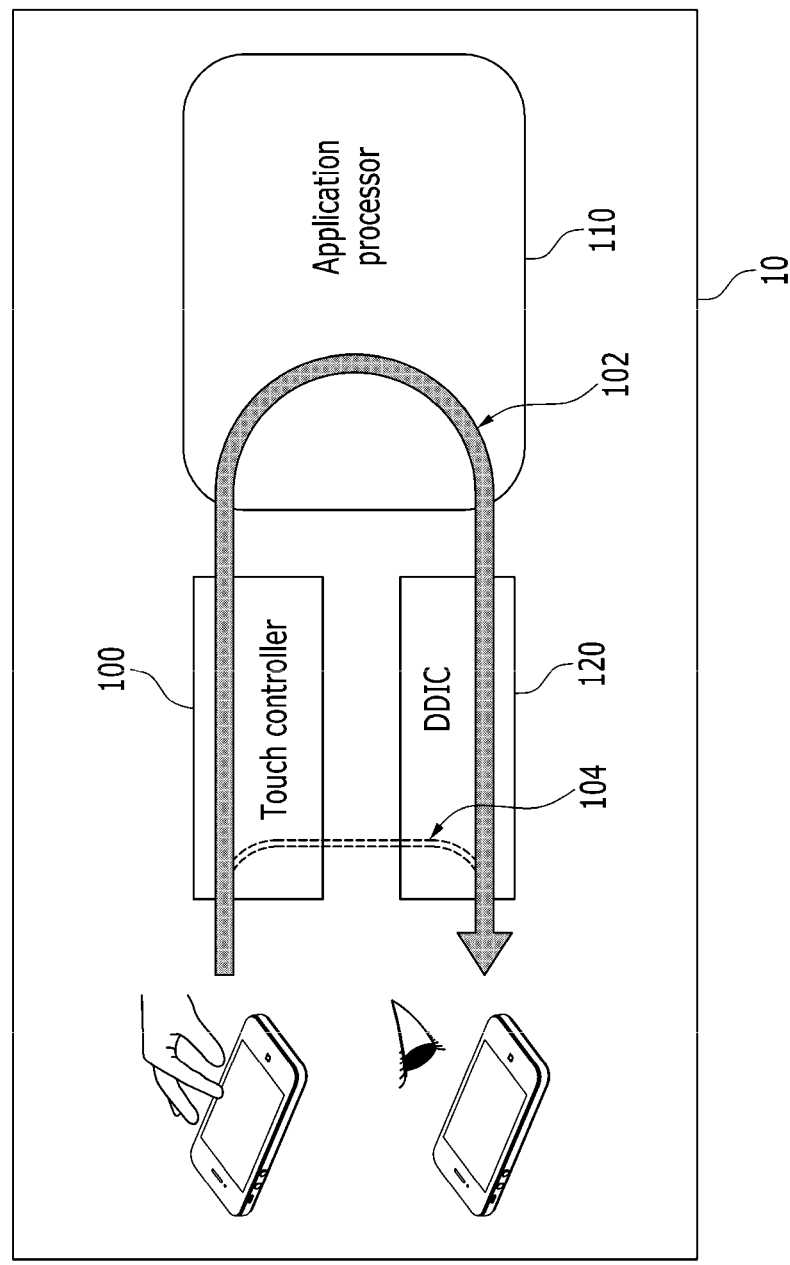
FIG. 1 exemplarily illustrates a response of a terminal including a touch input device according to an exemplary embodiment.

Hereinafter, exemplary embodiments disclosed in the present specification are described with reference to the accompanying drawings. In the present specification, the same or similar components are denoted by the same or similar reference numerals, and overlapping descriptions thereof are omitted.

The terms "module" and "unit" are used in the following description for ease of description to refer to components. However, these terms themselves do not have meanings or roles that distinguish them from each other.

Further, a detailed description of well-known art associated with the present system and method is omitted to avoid obscuring the description of the present system and method.

In addition, the accompanying drawings are provided to facilitate the understanding of the exemplary embodiments disclosed herein and are not limiting of the present system and method. Those of ordinary skill in the art would appreciate that modifications, equivalents, and substitutions of the teachings herein may be made without departing from the scope and spirit of the present system and method.

Terms including ordinal numbers such as first, second, and the like, are used to distinguish various components and are not limiting of these components.

When one component is referred to as being "connected" or "coupled" to another component, it may be connected or coupled directly to the other component or may be connected or coupled to the other component with an intervening component in between.

On the other hand, when one component is referred to as being "connected or coupled directly" to another component, it is connected to or connected to the other component without an intervening component in between.

Singular forms used herein include plural forms unless the context clearly indicates otherwise.

The terms "comprise" or "have" used in the present specification specify the presence of stated features, numerals, steps, operations, components, parts, or a combination thereof, but do not preclude the presence or addition of one or more other features, numerals, steps, operations, components, parts, or a combination thereof.

A person of an ordinary skill in the art would appreciate that configurations according to exemplary embodiments described in the present specification can be applied to mobile phones, smart phones, laptop computers, digital broadcasting terminals, personal digital assistants (PDAs), portable multimedia players (PMPs), navigation devices, slate PCs, tablet PCs, ultrabooks, wearable devices, for example, watch-type terminals (smartwatches), glass-type terminals (smart glasses), head mounted displays (HMDs), and fixed terminals such as digital TVs, desktop computers, digital signages, etc.

The exemplary embodiments disclosed herein allow a user to perceive a quicker touch response by displaying an image based on touch positions before the image is rendered by an application processor.

In addition, the exemplary embodiments may reduce power dissipated in the terminal by down-scaling a touch event according to a resolution of an input video image.

Software designed for touch interfaces commonly uses a drawing of paths on a screen and/or a graphical representation of direct physical manipulation of pseudo "real-world" objects to provide a visual feedback (e.g., for a trace of a finger in swiping or gesture-based onscreen keyboard, a trace of the path in a drawing or sketchbook application, and a path drawn in a game).

Delayed response by a user interface (UI) of a terminal may cause user dissatisfaction.

Typically, it takes 50 milliseconds to 20 milliseconds for current terminals to update its display in response to a touch action.

The exemplary embodiments disclosed herein allow a user to quickly perceive a touch response before an image is rendered by an AP by overlaying the image on touch paths.

By narrowing a gap between a touch point of the user on a screen (whenever a finger, a stylus, or other tool is used) and drawing of a line, a perceived display lag can be reduced.

Hereinafter, when used as a verb, the term "overlay" refers to combining or replacing parts of original video images (e.g., images rendered by the AP) with additional image data.

When used as a noun, the term "overlay" may also refer to the appearance of the additional image data in a combined display image.

In addition, by using an overlay method, an application software may also control a display area of the response for the touch event (e.g., a position on the display) and coloring and rendering operations.

FIG. 1 exemplarily illustrates a response of a terminal including a touch input device according to an exemplary embodiment.

As illustrated, the video images may be displayed by taking a latency path 102 via an application processor 110.

According to the exemplary embodiment of FIG. 1, the video images may be displayed by taking a low latency path 104 via a touch controller 100 and a display driver interface controller (DDIC) 120 before the video images finish taking the latency path 102.

That is, the exemplary embodiment of FIG. 1 relates to a low power and low latency overlay system (referred to as an "accelerator" or "visual feedback accelerator") for immediately or more quickly providing the visual feedback.

Figure 2:
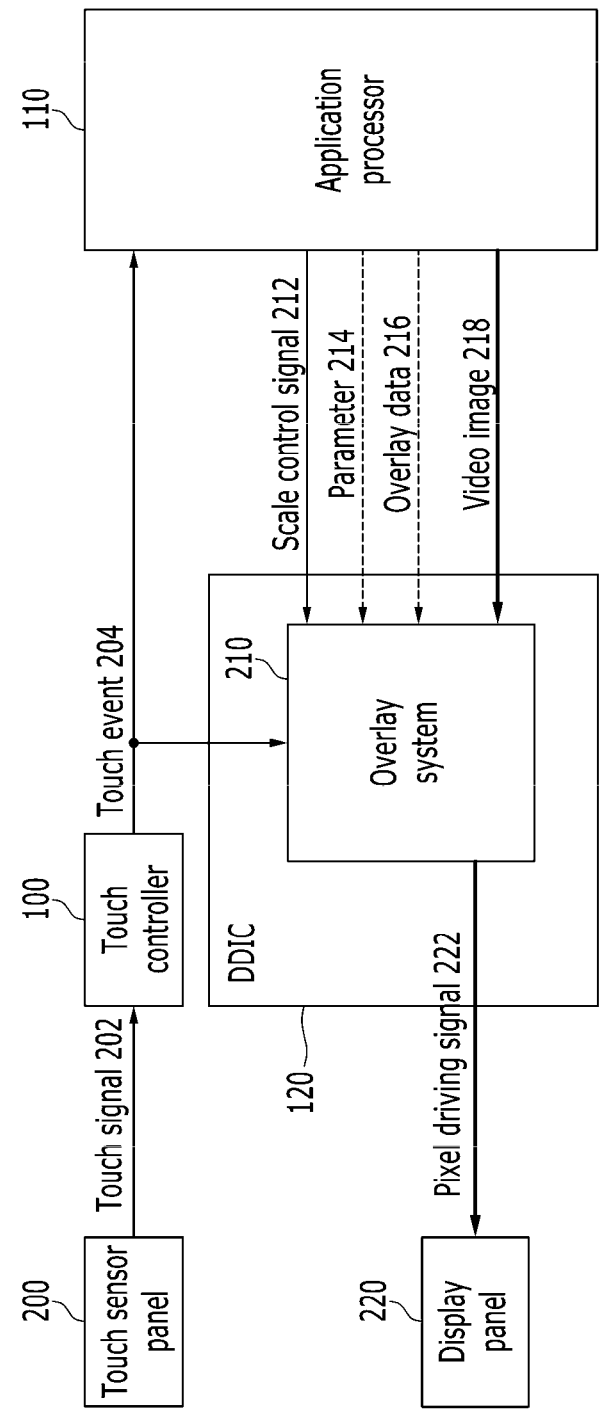
FIG. 2 is a schematic block diagram of the terminal including a low latency overlay system according to an exemplary embodiment.

FIG. 2 is a schematic block diagram of a terminal 10 including the low latency overlay system according to an exemplary embodiment.

As illustrated, a touch screen system and a display system in the terminal 10 can be operated by themselves.

The touch controller 100 processes a touch signal 202 received from a touch sensor panel 200, and may output a touch event 204 such as coordinates to the application processor (AP) 110 and the DDIC 120.

When processing the touch signal 202, the touch controller 100 may down-scale the touch signal 202.

The touch sensor panel 200 is configured to detect touches of the user, and may generate the touch signal 202 that is provided to the touch controller 100 through a data bus.

For example, the touch sensor panel 200 may detect the user's touch using any type of pointing tools such as a part of the user's body (e.g., a finger), a stylus, and the like.

Hereinafter, the term "pointing tools" refers to objects, including devices (e.g., an active stylus and a passive stylus) and parts of the body (e.g., fingers or palms), that can be detected by the touch sensor panel 200.

The touch sensor panel 200 may include one of various types of touch input panels such as a resistive-type touch panel, a surface acoustic wave (SAW) touch panel, a capacitive-type touch panel, an infrared touch panel, and an optical touch panel.

The touch signal 202 may correspond to raw data, such as measured values of capacitance, a voltage, and a current, that indicate respective positions in the touch sensor panel and that are provided by the touch sensor panel 200.

The data bus for the touch event 204 may be connected to both of the application processor 110 and an overlay system 210.

The touch event 204 may be a stream of data values corresponding to positions where the touches of the user are detected (e.g., change in the capacitance, the voltage, or the current that is sufficient to detect the touch event).

The touch event 204 may include pressure data that indicates pressure applied to the touch sensor panel 200.

The application processor 110 processes the touch event 204, and the application software run by the AP renders a video image 218 (frames or video images) for display on a display panel 220, thereby updating display synthesis in accordance with processing of the DDIC 120.

The application processor 110 may include a central processing unit (CPU), a graphical processing unit (GPU), and a memory.

The application processor 110 may be connected to the DDIC 120.

The DDIC 120 may be connected to the display panel 220.

The DDIC 120 may receive the video image 218 from the application processor 110, and may provide a pixel driving signal 222 to the display panel 220.

The display panel 220 may include at least one of a liquid crystal display (LCD) panel, a thin film transistor liquid crystal display (TFT LCD) panel, an organic light-emitting diode (OLED) panel, a flexible display panel, a 3D display panel, and an e-ink display panel.

In one exemplary embodiment, the touch sensor panel 200, the touch controller 100, the DDIC 120, and the display panel 220 are all of the constituent elements of a display module, and these elements may be separately provided from the application processor 110.

In another exemplary embodiment, the touch sensor panel 200, the touch controller 100, the DDIC 120, and the display panel 220, or combinations thereof, may be positioned in separate modules, or may be combined with the application processor 110.

The DDIC 120 processes the video images 218 that are received from the application processor 110 (or frames of the video images), and may output the pixel driving signal 222 to the display panel 220.

Functions of a scale control signal 212, a parameter 214, and overlay data 216 are described below in more detail.

The overlay system 210 may reduce the power required to process the touch event, and may process the touch event 204 with the video image 218 so that display panel 220 more quickly displays visual responses to the touch event.

Figure 3:
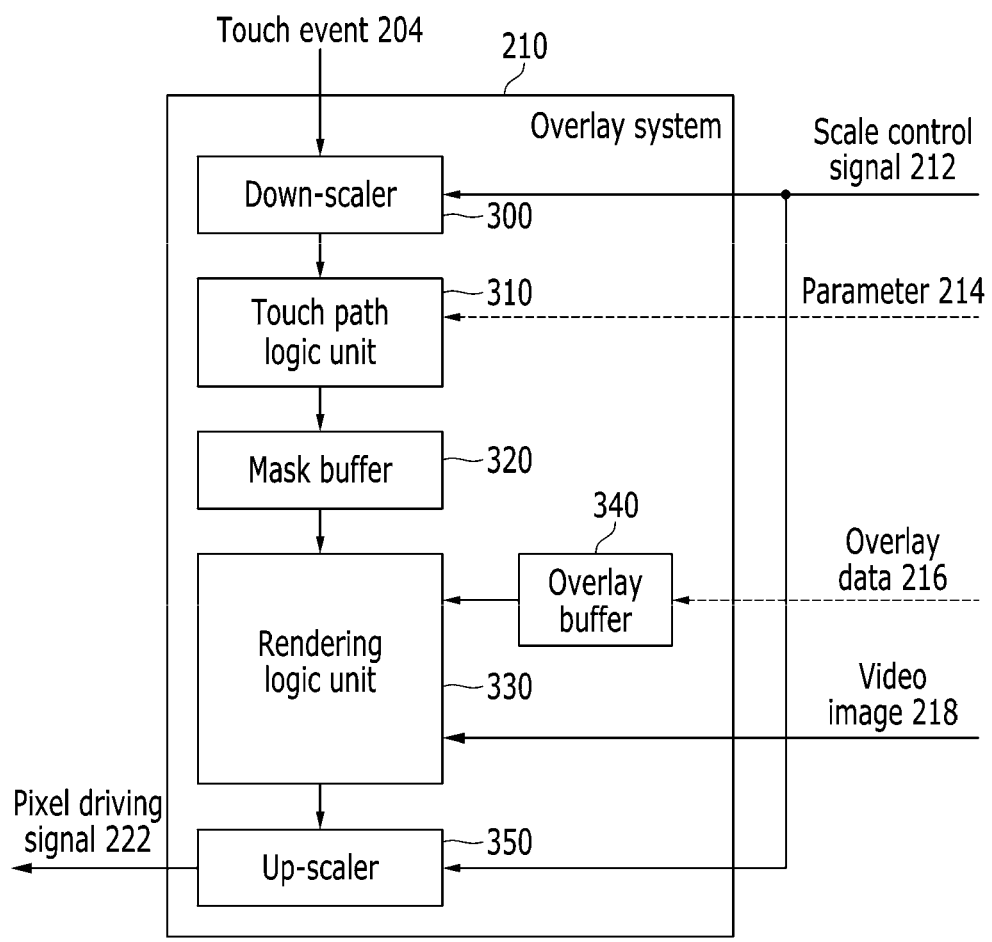
FIG. 3 is a block diagram illustrating constituent elements of the low latency overlay system according to an exemplary embodiment.

FIG. 3 is a block diagram illustrating constituent elements of the low latency overlay system according to an exemplary embodiment.

As illustrated, the overlay system 210 may include a down-scaler 300, a touch path logic unit 310, a mask buffer 320, an overlay buffer 340, a rendering logic unit 330, and an up-scaler 350.

The overlay system 210 may be included as constituent elements of the DDIC 120, or parts of the overlay system 210 may be included in the DDIC 120 or the application processor 110 while the other parts may be included in the touch controller 100.

The down-scaler 300 is connected to the touch controller 100, and may receive the touch event 204 from the touch controller 100.

In addition, the down-scaler 300 may receive the scale control signal 212 from the application processor 110.

In addition, the down-scaler may be connected to the touch path logic unit 310.

The down-scaler 300 may down-scale the touch event according to the scale control signal 212.

For example, when the scale control signal 212 is transmitted from the application processor 110, the down-scaler 300 may process and down-scale the touch event having a high amount of data to a touch event having a low amount of data.

If the scale control signal 212 is not received from the application processor 110, even if the touch event 204 is received, the down-scaler 300 may not process the touch event having the high amount of data.

Depending on whether the scale control signal 212 is received or not, the touch event suitable for high resolution may be down-scaled such that it is suitable for low resolution.

The touch path logic unit 310 is connected to the down-scaler 300, and may receive the down-scaled touch event 204 from the down-scaler 300 or the original touch event 204.

The touch path logic unit 310 may also be connected to the application processor 110 to receive the configuration parameter 214.

The touch path logic 310 unit may be connected to the mask buffer 320 that is used by the rendering logic unit 330.

The overlay buffer 340 is connected to the application processor 110, and includes a memory in the DDIC 120 for storing the overlay data 216 received from the application processor 110.

The overlay buffer 340 may provide the stored overlay data 216 to the rendering logic unit 330.

However, the present system and method are not limited to the above-described exemplary embodiments.

For example, the overlay data 216 may be generated in the overlay system 210 and not received from application processor 110.

Alternatively, the overlay data 216 may be a combination of data generated in the overlay system 210 and data corresponding to the inputs received from the application processor 110.

The rendering logic unit 330 is connected to the application processor 110 and the overlay buffer 340, and may combine the overlay data 216 with the video image 218 depending on values in mask data.

The rendering logic unit 330 may be connected to the up-scaler 350 to provide the up-scaler 350 with a display image in which the overlay data 216 and the video image 218 are combined.

The up-scaler 350 may be connected to the rendering logic unit 330 and the application processor 110.

The up-scaler 350 may receive the display image from the rendering logic unit 330.

The up-scaler 350 may receive the scale control signal 212 from the application processor 110.

The up-scaler 350 may up-scale the display image according to the scale control signal 212.

For example, when the scale control signal 212 is transmitted from the application processor 110, the up-scaler 350 may process and up-scale a low resolution display image to a high resolution display image.

If the scale control signal 212 is not transmitted from the application processor, 110, even when the display image is received from the rendering logic unit, the up-scaler 350 may not process the low resolution display image.

Depending on whether the scale control signal 212 is received or not, the touch event suitable for a low resolution may be up-scaled such that it is suitable for high resolution.

The up-scaler 350 is connected to the display panel 220 to provide the up-scaled display image to the display panel 220 as the pixel driving signal 222.

However, the present system and method are not limited to the above-described exemplary embodiments.

The down-scaler 300, the touch path logic unit 310, the mask buffer 320, the overlay buffer 340, the rendering logic unit 330, and the up-scaler 350 may be respectively implemented using different application specific integrated circuits (ASICs).

In another exemplary embodiment, a single ASIC is used to implement all the functions.

In another exemplary embodiment, a field programmable gate array (FPGA) may be programmed to perform the functions of the down-scaler 300, the touch path logic unit 310, the mask buffer 320, the overlay buffer 340, the rendering logic unit 330, and the up-scaler 350.

Alternatively, a general-purpose processor may be programmed to perform the respective functions of the down-scaler 300, the touch path logic unit 310, the mask buffer 320, the overlay buffer 340, the rendering logic unit 330, and the up-scaler 350 (e.g., using commands stored in a memory connected to the general-purpose processor).

In further exemplary embodiments, at least one or more functions of the down-scaler 300, the touch path logic unit 310, the mask buffer 320, the overlay buffer 340, the rendering logic unit 330, and the up-scaler 350 may be implemented by the constituent elements of the touch controller 100 or the application processor 110.

In addition, even though the down-scaler 300, the touch path logic unit 310, the mask buffer 320, the overlay buffer 340, the rendering logic unit 330, and the up-scaler 350 are illustrated as the constituent elements of the DDIC 120 in FIG. 3, the present system and method are not limited thereto.

In some exemplary embodiments, one or more of the down-scaler 300, the touch path logic unit 310, the mask buffer 320, the overlay buffer 340, the rendering logic unit 330, and the up-scaler 350 (or the constituent elements for performing these functions) may be disposed in the touch controller 100 and the application processor 110 or as separate constituent elements.

In addition, these constituent elements or the functions performed thereby may be disposed in different parts of the terminal 10.

For example, the down-scaler 300 and the touch path logic unit 310 may be implemented as the constituent elements or the functions of the touch controller 100, and the overlay buffer 340, the rendering logic unit 330, and the up-scaler 350 may be implemented as the constituent element (or constituent elements) or the function (or functions) of the application processor 110.

In addition, even though the touch controller 100 is illustrated as a physically separate constituent element in FIG. 2, the touch controller 100 may be a part of a greater integrated circuit (IC) in some exemplary embodiments.

For example, the touch controller 100 may be implemented in the same IC along with the application processor 110 and/or the DDIC 120.

Figure 4:
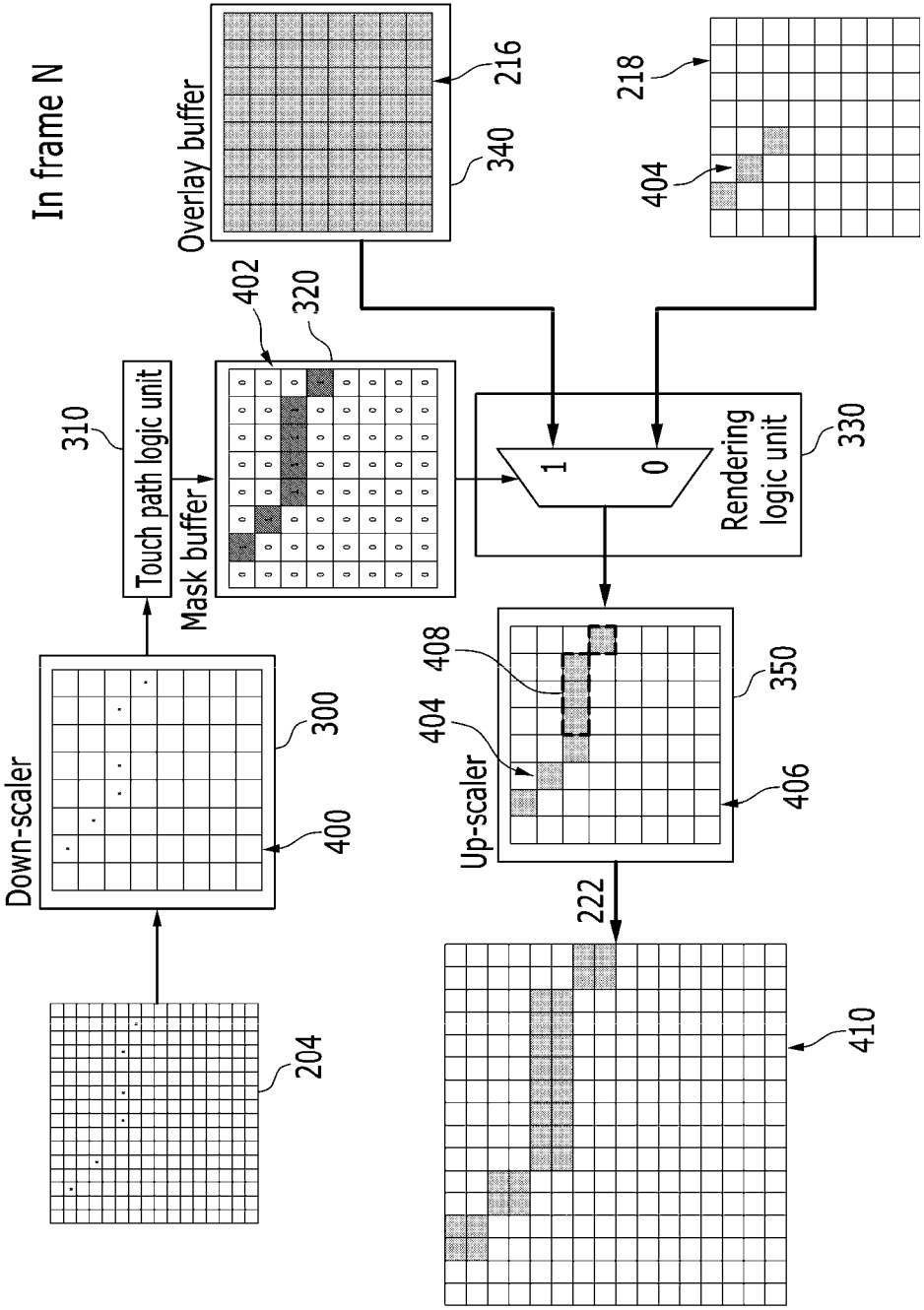
FIG. 4 is a schematic diagram illustrating how video image data, overlay data, and touch path information are constructed to generate a first combined display image according to an exemplary embodiment.

FIG. 4 is a drawing schematically illustrating how the video image 218 (or frames of the video image), the overlay data 216, and the touch event 204 are combined to generate a first set of combined display images 406 (e.g., to generate a frame N) for an N-th frame according to an exemplary embodiment.

As illustrated, the down-scaler 300 may down-scale the touch event 204 that is received from the touch controller 100.

For example, when a touch event corresponding to a 16×16 resolution is received from the touch controller 100, the touch event may be processed by the down-scaler 300 to correspond to a lower 8×8 resolution according to the scale control signal 212 that is received from the application processor 110.

In this case, the application processor 110 may determine a degree of scaling according to the resolution of the video image, and may include information about the degree of scaling in the scale control signal 212 that is output to the down-scaler 300.

Then, the down-scaler 300 may scale the received touch event according to the information about the degree of scaling that is included in the scale control signal 212.

Accordingly, the touch event may be scaled by the down-scaler 300 such that it corresponds to the resolution of the video image.

The touch path logic unit 310 may process a touch event 400 that is received from the down-scaler 300.

The touch path logic unit 310 may generate an estimated touch path using interpolation and/or extrapolation based on the positions of subsets of the touch events received over a plurality of previous continuous frames (e.g., previous X frames), for example, sets of the continuous touch events.

The estimated touch path is then applied to generate mask data 402 that is stored in the mask buffer 320 by the touch path logic unit 310.

The rendering logic unit 330 combines the overlay data 216 stored in the overlay buffer 340 with the video image for the N-th frame received from the application processor 110 according to the mask data 402, and selects one of the overlay data 216 and the video image 218 (or mixes them), thereby creating a combined display image 406.

The mask data 402 is a matrix of values, and positions in the matrix may correspond to positions of pixels (or a pixel) in the display panel 220.

In addition, the relative positions of the values in the matrix may correspond to the relative positions of the pixels in the display panel 220 (e.g., the mask data 402 may be regarded as a two-dimensional matrix corresponding to a two-dimensional map of the pixel positions in the combined display image 406).

The values of the mask data 402 may be represented by a single bit, respectively.

In addition, the positions of the values in the mask data matrix may correspond to the positions of the combined display image 406.

In the combined display image 406, the positions at which the overlay data 216 should be shown have values set to a first value (e.g., "1"), while the positions at which the overlay data 216 should not be shown (e.g., at which the video image data should be shown) have values set to a second value (e.g., "0").

The values of the mask data 402 may be represented by a plurality of bits (e.g., 8 bits), respectively.

The values of the mask data 402 represent "transparency" of the overlay data at respective locations in the display.

Hereinafter, "transparency" represents the display image 406 combined by mixing (e.g., merging) the overlay data 216 with the video image 218 and taking characteristics of both of them.

The touch path logic unit 310 may generate the estimated touch path for each video frame based on the subsets of the touch events corresponding to a predetermined number of video frames.

The number of video frames may be configured to correspond to a display lag that may occur when passing through the application processor 110.

The touch path logic unit 310 generates the touch path for a variable number of video frames.

The number of video frames may be determined by an external logic unit based on the video images 218 that are passed through the application processor 110.

A set of parameters 214 controls the characteristics of the estimated touch path when the path is created.

These parameters 214 may have start-up defaults, and may be adjusted by software or other means during runtime if necessary.

These parameters may include a width of the generated path, single line segments, and a style of the line segments formed along with curved lines, a display area where the path is allowed (e.g., active drawing area), and a style of rendering operations (e.g., antialiasing operations, smoothing operations, and transparentizing).

For example, when an exemplary embodiment is used in an environment of a software application for drawing (e.g., a digital sketchbook), an overlay image segment 408 (or referred to as a computed part), which is a part of the combined display image 406, is applied only to parts of the display corresponding to the active drawing area.

Generally, the overlay system 210 does not apply the overlay data to the parts of the display outside the active drawing area.

As such, the parameters 214 may be set to limit the estimated touch path to the parts of the display corresponding to the active drawing area.

The parameters 214 may include a width of the drawn line.

Before an AP-generating line (or image segment) is received from the application processor 110, the touch path logic unit 310 may use the parameters to render the mask data 402 with a shape of the line along with pressure data that are received from the touch event 204.

When each pixel of the video image 218 is processed by the rendering logic unit 330, the rendering logic unit 330 may search the positions of the values in the mask data 402

(e.g., the positions in the matrix) that correspond to the positions of the pixels (or pixel) of the video image 218.

In addition, to achieve desired visual effects (e.g., transparency and/or antialiasing), the rendering logic unit 330 may mix the pixels of the video image 218 with the overlay data 216 according to the values in the mask data 402.

Alternatively, to achieve desired visual effects (e.g., transparency and/or antialiasing), the rendering logic unit 330 may replace the pixels of the video image 218 with the overlay data 216 according to the values in the mask data 402.

The rendering logic unit 330 may perform the rendering operation for setting the respective pixels to either the overlay data 216 or the video image 218 based on the values in the positions of the mask data 402 corresponding to the positions of the pixels (or pixel) in the combined display image 406.

The number of values of the mask data 402 (or a size thereof) may be identical to the number of pixels in one frame of the video image 218.

Accordingly, the number of values of the mask data 402 (or the size thereof) may be identical to the number of pixels in the combined display image 406.

Therefore, one-to-one correspondence may exist between the respective values in the mask data 402 and the respective pixels of the video image 218.

That is, the rendering logic unit 330 may evaluate the respective values in the mask data 402 that correspond to the pixels in the video image 218, and may output the pixels of the video image 218 or the overlay data 216 to the up-scaler 350 depending on the respective values in the mask data 402.

For example, the rendering logic unit 330 may repeat the rendering operations for the respective values of the mask data 402.

When a value of 0 exists at a specific position in the mask data 402, the rendering logic unit 330 may output the corresponding pixel of the video image 218.

Conversely, when a value of 1 exists at the specific position in the mask data 402, the rendering logic unit 330 may output the overlay data 216.

As a result of repeated processes, the rendering logic unit 330 outputs the combined display image 406 to the up-scaler 350.

Figure 5:
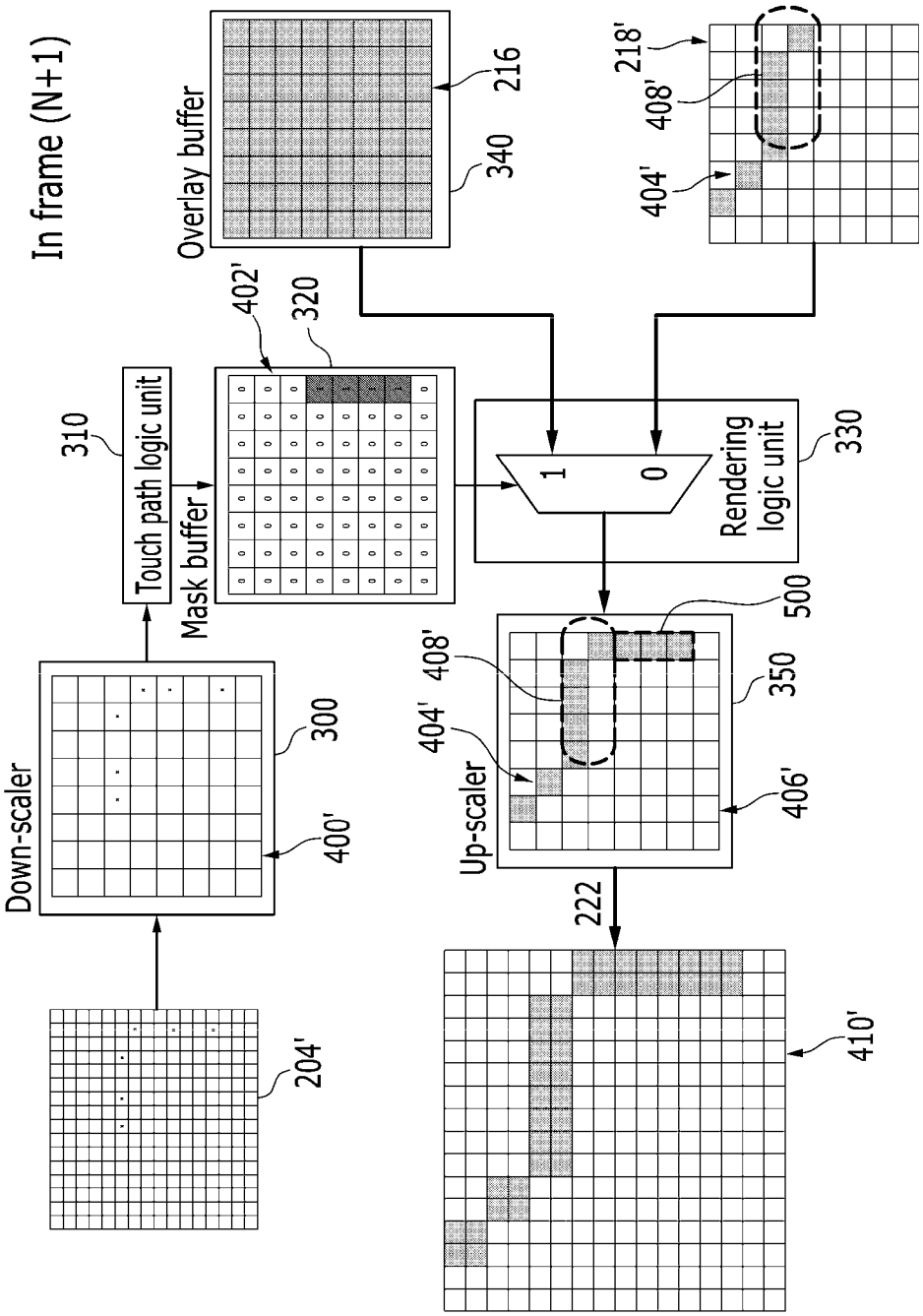
FIG. 5 is a schematic diagram illustrating how video image data, overlay data, and touch path information are constructed to generate a second combined display image according to an exemplary embodiment.

In another exemplary embodiment, such as shown in FIG. 5, the number of the values in the mask data 402 may be smaller than the number of pixels in the frame of the video image 218.

In such case, the respective values in the mask data 402 have one-to-many correspondence with the pixels of the video images 500 such that the values in the mask data 402 correspond to the plurality of pixels of the video image 218, thereby reducing the size of the mask data 402 and memory requirements of the mask buffer 320.

In a further exemplary embodiment, a mix level (e.g., transparency level) that is rendered by the rendering logic unit 330 may be identified by values in the mask data 402.

When the plurality of rendering operations are supported by the rendering logic unit 330, one or more bits of the values in the mask data 402 may be used to define the desired rendering operation, while the other bits may be used to adjust specifications of the rendering operations.

For example, the rendering logic unit 330 may perform various rendering operations ranging from information transferred from the video image 218 to information transferred from the overlay data 216 such as edge-enhance, dodge (brightening), burn (darkening), etc.

The rendering operation may generate a transparent coloring (or highlighter) effect or an alpha compositing effect by changing the colors or luminosity of the parts of the video image 218.

The rendering logic unit 330 receives two inputs. A first input includes the video image 218 received from the application processor 110, and a second input includes the overlay data 216 received from the overlay buffer 340.

The overlay buffer 340 stores the overlay data 216 that is processed by the rendering logic unit 330.

The overlay data 216 may be provided by the application processor 110 or internally generated in the overlay system 210, in which case characteristics of the overlay data 216 may be determined by a desired output of the rendering logic unit 330.

The characteristics of the overlay data 216 (e.g., appearance) may be combined with the characteristics of the video image 218 (e.g., appearance).

Accordingly, when being rendered according to the mask data 402, the combined display image 406 may be rendered without discontinuity between an image segment 404 and the overlay image segment 408.

The characteristics of the overlay data 216 may include a color.

For example, when a black line is drawn by the application software, the overlay data 216 may include the same black color as the line that is drawn by the software (e.g., bitmapped image in which all pixels are black).

For this purpose, the overlay data 216 may be provided by the application processor 110, or may be internally generated in the overlay system 210.

The rendering logic unit 330 may output the combined display image 406 including the black line that is formed by disposing the image segment 404 received from the application processor 110 (e.g., the line drawn by the software) and the overlay image segment 408 to be adjacent to each other.

The overlay data 216 may include bitmap image data that may be textured or colored.

Content of the overlay data 216 may be dynamic in terms of time, and may be updated by the application processor 110 or by a mechanism in the DDIC 120.

The content may also be dynamic in terms of size and shape.

A plurality of different sets of overlay data 216 expressing a plurality of overlays may be stored in the overlay buffer 340.

In addition, the respective sets may include different colors, images, or textures.

In the present specification, the sets of the overlay data 216 may be referred to as a "page".

The values in the mask data 402 may also include information for enabling the rendering logic unit 330 to identify a specific page(s) of the overlay data 216 and to use the identified page(s) during the rendering operation.

The values of the mask data 402 include indexes for the pages of the overlay data 216 that enable the rendering logic unit 330 to switch between different pages of the overlay data 216 while the rendering logic unit 330 performs the rendering operation.

The number of values of each page (or a size thereof) may be identical to the number of pixels in one frame of the video image 218. In such case, one-to-one correspondence exists between the respective values of each page and the respective pixels of the video image 218.

The number of values of each page (or a size thereof) of the overlay data 216 may be smaller than the number of pixels in the frame of the video image 218. In such case, the respective values of each page of the overlay data 216 may have one-to-many correspondence with the pixels of the video image 218.

Accordingly, because the values of each page of the overlay data 216 correspond to the plurality of pixels of the video image 218, a size of the overlay data 216 may be reduced, and thus memory requirements of the overlay buffer 340 may be reduced.

For example, the overlay data 216 may include a single color value such as an RGB (red, green, and blue) color value.

The entire overlay image (or overlay image segment) 408 may be drawn using the single color value.

The different pages of the overlay data 216 may include respective values corresponding to the respective colors (e.g., different colors).

Alternatively, the respective values may be intermingled with other values in the overlay data 216 or other pages including the bitmapped images.

In addition, the rendering logic unit 330 may output the overlay data 216, the pixels of the video image 218, or the display image 406 in which they are mixed to the up-scaler 350.

The up-scaler 350 may upscale the display image 406 that is received from the rendering logic unit 330.

For example, when the display image 406 corresponding to an 8×8 resolution is received from the rendering logic unit 330, the display image 406 may be processed by the up-scaler 350 to correspond to a higher 16×16 resolution, which is the pixel resolution of the display panel, according to the scale control signal 212 that is received from the application processor 110.

In this case, the application processor 110 may determine a degree of scaling according to the video image and the pixel resolution of the display panel, and may include information about the degree of scaling in the scale control signal 212 that is output to the up-scaler 350.

Then, the up-scaler 350 may appropriately up-scale the received display image 406 according to the information about the degree of scaling included in the scale control signal 21 so that the up-scaled display image 410 being outputted is appropriately scaled according to the pixel resolution of the display panel.

Accordingly, the display image 406 may be scaled by the up-scaler 350 to correspond to the pixel resolution of the display panel.

The up-scaler 350 outputs the up-scaled overlay data 216, the pixels of the video image 218, or a mixture 410 thereof to the display panel 220 via the pixel driving signal 222.

FIG. 5 is a drawing schematically illustrating how a video image 218' (or frames of the video images), the overlay data 216, and a touch event 204' are combined to generate a second set of combined display images 410' (e.g., to generate a frame (N+1)) for an (N+1)-th frame according to an exemplary embodiment.

As illustrated, in a subsequent frame (e.g., in the (N+1)-th frame, the next frame after the N-th frame corresponding to the first set of the display images 410), the video image 218' received from the application processor 110 includes an image segment 408' that is not displayed in the N-th frame (e.g., not illustrated in the video image 218 of FIG. 4).

For the (N+1)-th frame, the touch path logic unit 310 calculates different mask data 402' including a set of values different from those of the mask data 402 illustrated in FIG. 4 from a touch event 400'.

The rendering logic unit 330 outputs a combined display image 406', which is a mixture of the video image 218' received from the application processor 110 according to the mask data 402' and the overlay data 216, to the up-scaler 350.

The rendering logic unit 330 may output the combined display image 406' including a black line that is formed by disposing image segments 404' and 408' and an overlay image segment 500 received from the application processor 110 to be adjacent to each other.

The up-scaler 350 may upscale the display image 406' outputted from the rendering logic unit 330 according to the scale control signal 212 and output it as the pixel driving signal 222.

Figure 6:
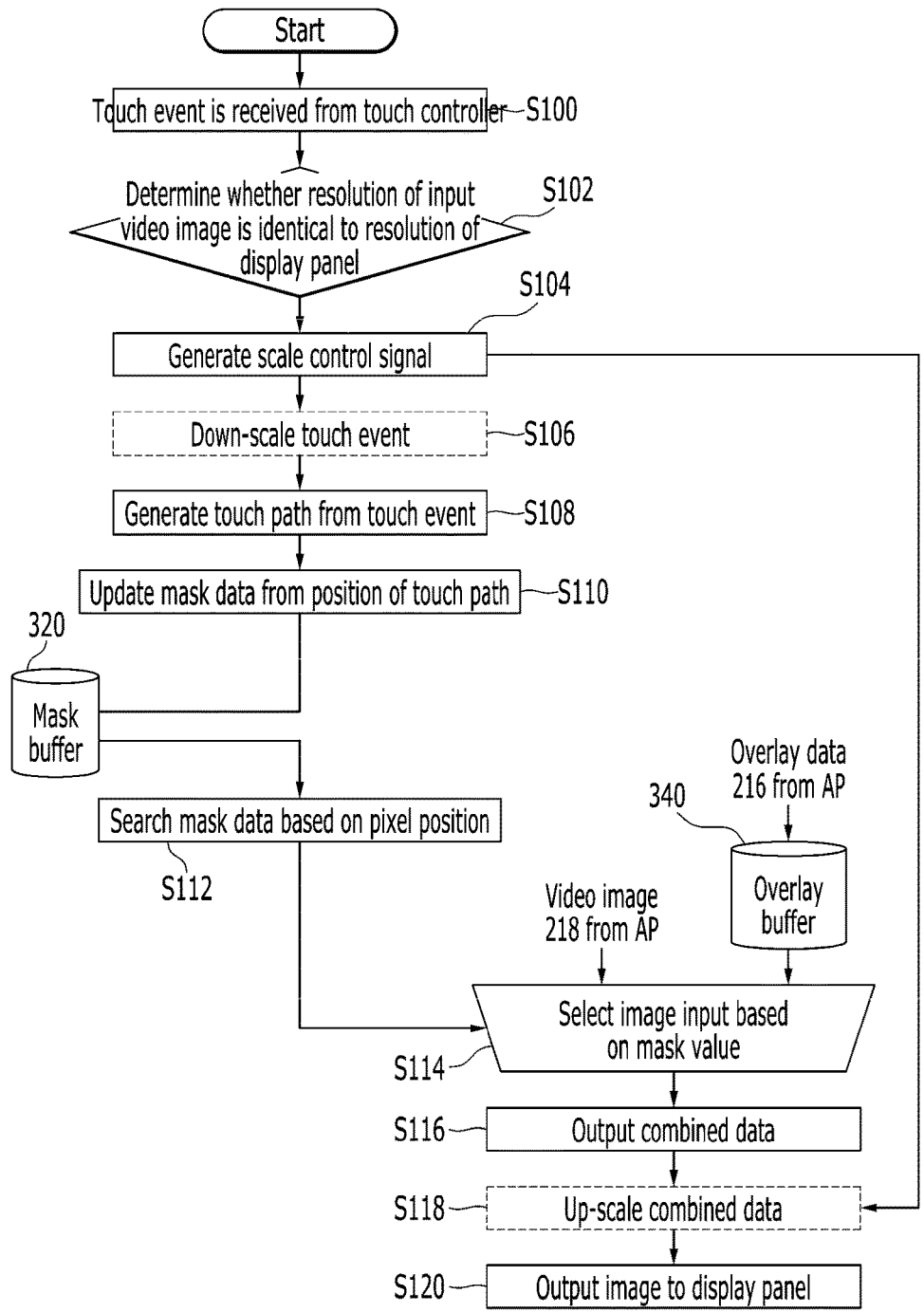
FIG. 6 is a flowchart illustrating a method for determining application of overlay data and combining the overlay data with a video image according to an exemplary embodiment.

FIG. 6 is a flowchart illustrating a method for determining application of overlay data and combining the overlay data with a video image according to an exemplary embodiment.

As illustrated, a touch event is received from an external source (e.g., touch controller) (S100).

Then, an application processor 110 determines whether a resolution of an input video image is equal to a resolution of a display panel (S102).

If the resolution of the video image is not equal to that of the display panel, the application processor 110 generates a scale control signal 212 (S104). For example, when the resolution of the video image is lower than that of the display panel, the application processor 110 may generate the scale control signal 212.

The scale control signal 212 may include information about a degree of scaling.

For example, the scale control signal 212 may include a signal for controlling a down-scaler 300 to down-scale the touch event 204, a signal for controlling an up-scaler 350 to up-scale the display image 406, and information about degrees of down-scaling and up-scaling.

The down-scaler 300 down-scales the received touch event according to the scale control signal 212 (S106). The down-scaled touch event may be outputted to a touch path logic unit.

The touch path logic unit creates a touch path (or estimated touch path) between the touch events by using interpolation or extrapolation (S108). The interpolation method may be adjusted, for example, by parameters for configuring a width, a style, a straight or curved area, and a color of an overlay image segment 408 of the combined display image.

The touch path logic unit generates mask data 402 from the touch path (S110), and the generated mask data 402 is stored in a mask buffer 320.

On the touch path, relative positions of the values of the mask data 402 may correspond to relative positions of the pixels of the display panel.

The values of the mask data 402 represent whether the corresponding pixel of the combined display image should include the overlay data received from an overlay buffer 340, the video image received from the AP, or a mixture thereof.

The mask data 402 is searched from the mask buffer 320 (S112).

The searched values are disposed at positions in the mask data 402 corresponding to the positions of the pixels that are currently processed by the rendering logic unit 330.

Using the values of the mask data 402 corresponding to the positions of the pixels that are currently processed in the display panel, the rendering logic unit 330 selectively outputs the overlay data received from the overlay buffer 340, the video image received from the AP, or the mixture thereof (S114).

The combined display image is outputted to the up-scaler 350 (S116).

The up-scaler 350 up-scales the received display image according to the scale control signal 212 (S118). Then, the up-scaled display image is outputted and provided to the display panel so that the overlay data 216 combined with the video image may be displayed (S120).

As described above with respect to the exemplary embodiments, by scaling the touch event or the display image, a device and method capable of reducing power consumption caused by high-capacity data transmission and reducing an overall system latency by adopting a low latency loop are provided.

The low latency display images may be generated by combining the information received from the mask data 402 that is generated from the touch path, the overlay data 216 received from the overlay buffer, and the high latency video image received from the AP.

The touch path is calculated from the touch events (e.g., outputs received from the touch controllers) that are recorded according to elapse of time.

The overlay data 216 may be provided by the AP, or may be generated by the overlay system.

Overlay characteristics, for example, including color, dimensions (e.g., a width), continuity, shading, and timing, may be dynamically adjusted.

These adjustments may be provided as a set of parameters by the AP, or may be internally produced by the overlay system by analyzing, for example, the video images that are received from the AP.

The adjustments may be determined by touch actions.

For example, the width of the resultant line may be adjusted according to the pressure applied to a touch sensor panel (e.g., the width parameter is proportional to the measured pressure of the touch event).

The display image is generated by the overlay system using the mask data 402, which is calculated from the touch path.

Mapping and size adjustment parameters may be provided by the AP, and for example, may be calculated in the overlay system by analyzing the touch event and the video images that are received from the AP.

The overlay data may be merged at a pixel level with the video images that are received from the AP by the rendering logic unit 330.

In one exemplary embodiment, pixel characteristics received from the video images are replaced with pixel characteristics received from the overlay data according to the values of the mask data 402.

In other exemplary embodiments, new pixel characteristics are produced based on the video images and a mixture of the respective pixel characteristics.

The present system and method may be implemented as computer-executable code in a computer-readable medium in which a program is recorded.

The computer-readable medium may include all kinds of recording apparatuses in which data that may be read by a computer system are stored.

An example of the computer readable medium may include a hard disk drive (HDD), a solid state disk (SSD), a silicon disk drive (SDD), a read only memory (ROM), a random access memory (RAM), a compact disk read only memory (CD-ROM), magnetic tape, a floppy disk, optical data storage, or the like, and may also include a medium implemented in a form of a carrier wave (for example, transmission through the Internet).

In addition, the computer may include the application processor 110 of the terminal 10.

The above detailed description is not to be interpreted as being restrictive, but is to be considered as being illustrative.

The scope of the present system and method is to be determined by reasonable interpretation of the claims and includes all alterations within equivalences of the present system and method.

| <Description of Symbols> | |
| --- | --- |
| 100: touch controller | 110: application processor |
| 120: DDIC 200: touch sensor panel | |
| 210: overlay system | 220: display panel |
| 300: down-sealer | 310: touch path logic unit |
| 320: mask buffer | 330: rendering logic unit |
| 340: overlay buffer | 350: up-scaler |

What is claimed is:

1. A system comprising:
a first scaler configured to receive a plurality of touch events and down-scale the touch events to generate down-scaled touch events;
a touch path logic configured to generate an output based on the down-scaled touch events;
an application processor configured to generate the video image;
a rendering logic configured to receive the video image, receive an output of the touch path logic, generate a display image by combining the video image with overlay data according to the output of the touch path logic, and output the display image, and
a second scaler configured to receive the display image and up-scale the display image to generate an up-scaled display image,
wherein the application processor is further configured to generate a signal for controlling the first scaler to down-scale the touch events only when a resolution of the video image is lower than a resolution of a display panel.

2. The system of claim 1, wherein the signal for controlling the first and second scalers includes information about degrees of the down-scaling and the up-scaling.

3. The system of claim 1, further comprising a touch controller configured to receive a plurality of touch signals from a touch sensor panel to generate the touch events.

4. The system of claim 1, wherein the output generated by the touch path logic includes mask data in the form of a matrix of values that respectively identify an operation of the rendering logic to construct the display image, and positions of the values in the matrix correspond to positions of pixels in the display image.

5. The system of claim 4, wherein the rendering logic combines the video image with the overlay data by determining whether to output the corresponding pixel of the video image or the overlay data according to the values of the corresponding positions in the mask data for the respective pixels in the display image.

6. The system of claim 4, wherein the touch path logic is further configured to receive parameters, calculate an estimated touch path according to the down-scaled touch events, and generate the mask data according to the estimated touch path and the parameters, and the parameters control a position of a mask area, or a width, a style, or a shape of the estimated touch path.

7. A method for providing visual feedback to a touch input, comprising:
- receiving a video image;
- receiving a plurality of touch events;
- generating a first signal for controlling a first scaler to down-scale the touch events and a second signal for controlling a second scaler to up-scale a display image; only when a resolution of the video image is lower than a resolution of the display panel,
- down-scaling the touch events using the first scaler to generate down-scaled touch events according to the first signal;
- generating an output based on the down-scaled touch events;
- combining the video image with overlay data according to the output to generate a display image;
- outputting the display image;
- receiving the display image;
- up-scaling the display image using the second scaler to generate an up-scaled display image according to the second signal; and
- displaying the up-scaled display image on the display panel.

8. The method of claim 7, wherein the signal for controlling the first and second scalers includes information about degrees of the down-scaling and the up-scaling.

9. The method of claim 7, further comprising receiving a plurality of touch signals from a touch sensor panel and generating the touch events based on the plurality of touch signals.

10. The method of claim 7, wherein generating the output includes generating mask data according to the down-scaled touch events, the mask data includes a matrix of values that respectively identify an operation of a rendering logic to construct the display image, and positions of the values in the matrix correspond to positions of pixels in the display image.

11. The method of claim 10, wherein constructing the display image includes combining the video image with the overlay data by determining whether to output the corresponding pixel of the video image or the overlay data according to the values of the corresponding positions in the mask data for the respective pixels in the display image.

12. The method of claim 10, wherein generating the output further includes: receiving parameters; calculating an estimated touch path according to the down-scaled touch events; and generating the mask data according to the estimated touch path and the parameter, wherein the parameters control a position of a mask area, or a width, a style, or a shape of the estimated touch path.

13. A display device comprising:
- a display including a display panel, and a touch sensor panel outputting a plurality of touch signals;
- an application processor receiving video frames and generating a first signal for down-scaling the plurality of touch signals and a second signal for up-scaling video frames to-be up-scaled only when a resolution of the video frames is lower than a resolution of the display panel; and
- an overlay circuit for:
  - receiving the video frames from the application processor,
  - receiving the plurality of touch signals from the touch sensor panel,
  - down-scaling the touch signals according to the first signal,
  - determining a touch path based on the down-scaled touch signals,
  - updating the rendered video frames based on the touch path and stored overlay data to generate updated video frames, and
  - up-scaling the updated video frames to generate up-scaled display images according to the second signal to display the up-scaled display images on the display.

* * * * *